United States Patent [19]

Stacey et al.

[11] 3,849,677

[45] Nov. 19, 1974

[54] HYBRID POWER FILTERS EMPLOYING BOTH ACTIVE AND PASSIVE ELEMENTS

[75] Inventors: Eric J. Stacey; Eugene C. Strycula, both of Pittsburgh, Pa.

[73] Assignee: Westinghouse Electric Corporation, Pittsburgh, Pa.

[22] Filed: June 26, 1973

[21] Appl. No.: 373,726

[52] U.S. Cl. .................. 307/295, 307/252 T, 321/9, 333/76

[51] Int. Cl. ............................................. H03h 7/10

[58] Field of Search ................ 333/17, 76, 79, 80 T; 328/162, 165–167; 321/9, 10; 307/252 T, 295

[56] References Cited

UNITED STATES PATENTS

| | | | |
|---|---|---|---|
| 2,959,738 | 11/1960 | Nagai | 328/167 |
| 3,117,292 | 1/1964 | Bixby | 333/79 |
| 3,475,702 | 10/1969 | Ainsworth | 333/76 X |
| 3,551,780 | 12/1970 | Gautherin | 333/79 X |

OTHER PUBLICATIONS

Higuchi, Active Equivalent Series Resistance Filter, IBM Tech. Disclosure Bulletin, Vol. 14, No. 2, July 1971.

*Primary Examiner*—Paul L. Gensler
*Attorney, Agent, or Firm*—J. J. Wood

[57] ABSTRACT

A hybrid power filter employing both active and passive filtering elements retaining the advantages of these elements while overcoming the main disadvantages of each when used separately. In one embodiment of the invention, the passive element comprises a capacitor and inductor in series across the power conductors connecting a source section to a load section and tuned to the frequency of the major ripple component. In shunt with the inductor, or possibly the capacitor, is an active element which generates a synthetic ripple which opposes and eliminates any residual ripple component which may pass from the source to the load section, or vice versa, due to the inherent resistance of the passive filter or to detuning of the filter formed by the passive elements. Multiple hybrid filters of this type may be connected across the power conductors, each filter being tuned to a selected frequency in a range of expected harmonic frequencies. In another embodiment of the invention, the passive element comprises a capacitor and an inductor in parallel, the parallel combination being connected in series between the source and load, together with an active element connected across the inductor of the filter.

4 Claims, 7 Drawing Figures

HYBRID POWER FILTERS EMPLOYING BOTH ACTIVE AND PASSIVE ELEMENTS

BACKGROUND OF THE INVENTION

In many electrical and electronic power systems, particularly those employing solid-state switching devices, rectifiers or other non-linear elements, the generation of unwanted harmonic components is unavoidable, either at the input source section or at the output load section. To minimize the effects of these harmonics, at the input or output of the system, some form of filtering is usually necessary. In the past, most filters of this type employed only passive components (e.g., inductors and capacitors). The most obvious passive alternating current filter would be a low-pass type, utilizing the inductance of the alternating current source as the series element and an external capacitor as the shunt element. By the proper choice of the shunt capacitor, a filter of this type can be designed to attenuate all current harmonics generated by a non-linear load to the desired level. Unfortunately, however, in high power, low frequency applications, the value, size and rating of the shunt capacitor as well as the extra KVAR demand on the alternating current source becomes excessively high to warrant any practical use for this arrangement.

The other extreme approach is to provide a plurality of single-tuned shunt branches for each order harmonic present in the unfiltered current waveform. Theoretically, this approach would require an infinite number of shunt branches, each separately tuned to one of the harmonics. Again, the cost and complexity of such an arrangement makes it impractical for most applications. A practical compromise is to use separate, single-tuned shunt branches to remove the predominant harmonics and then remove all remaining higher order harmonics with a low-pass filter, such as a capacitor connected between the power leads connecting a source section to a load section. The design of this type of filter is, however, complicated by several factors which greatly influence the practicability of the arrangement. The major problem is to design the single-tuned branches so as to provide adequate attenuation for the range of frequency variation allowed for the alternating current source section. As the variation of the supply frequency increases, the variation of the predicted harmonic frequencies become larger and the values of the specific components required in each single-tuned branch become more impractical. Another problem is that the single-tuned branches do not handle "untheoretical" harmonics which may be present in the current waveform due to unbalances, faulty rectifiers and the like.

Another approach is to utilize active filtering. One type of active filter is described in co-pending application Ser. No. 369,333, filed on June 12, 1973 for Electrical Power System in the names of Laszlo Gyugyi, Eugene C. Strycula, Eric J. Stacey, and assigned to the Assignee of the present application. The active filter described in the aforesaid copending application replaces the passive shunt elements with a harmonic generator controlled in such a manner that no harmonic voltage can appear across it. It carries all of the harmonic current and the full-line voltage appears across it, therefore requiring components in the active filter having a relatively high power handling capability. It is possible to reduce the volt-ampere rating of the harmonic generator by inserting a dropping impedance in series with the generator and controlling the current drawn through the dropping impedance so that most of the fundamental voltage appears across it. This arrangement, while reducing the volt-ampere rating of the active generator, nevertheless requires that the generator still be rated to handle the full ripple current plus that fraction of the fundamental current necessary to drop the desired amount of fundamental voltage across the reactive element in series with the active generator.

SUMMARY OF THE INVENTION

In accordance with the present invention, a hybrid filter arrangement for high power application is provided which employs both active and passive elements while at the same time overcoming the main disadvantages of each when used separately.

Specifically, there is provided the combination of an electrical power system including power conductors for supplying power from a source section to a load section, one of the sections generating an electrical ripple to which the other section is subject in the absence of filtering. Passive filter means is interposed between the source section and the load section, the passive filtering means including an inductive and capacitive element. In shunt with one of the elements of the filtering means is an active element (controllable generator), operative when the passive filtering elements do not eliminate all of the ripple content, for generating a synthetic ripple which opposes and substantially eliminates the effect of any residual electrical ripple which might otherwise pass through the filtering means in the absence of the controllable generator.

In one embodiment of the invention, the filtering mean comprises a capacitor and an inductor connected in series between the power conductors, the controllable generator preferably being connected in shunt with the inductor. However, in some cases it may be connected in shunt with the capacitor. In another embodiment of the invention, the filtering means comprises the parallel combination of a capacitor and an inductor in one of the power conductors connecting the source section to the load section, together with a controllable generator in shunt with the inductor of the filtering means.

If it is desired, for example, to eliminate the appearance of source ripple voltage components across a load section, the voltage across the load may be sensed and passed through a fundamental frequency reject filter. The output of the fundamental frequency reject filter contains only the residual ripple components and can be used to control the active element. A similar arrangement can be provided for sensing the residual ripple voltage across the source section and for eliminating any ripple voltage resulting from ripple current generated by the load section.

The above and other objects and features of the invention will become apparent from the following detailed description taken in connection with the accompanying drawings which form a part of this specification, and in which.

Figure 1:
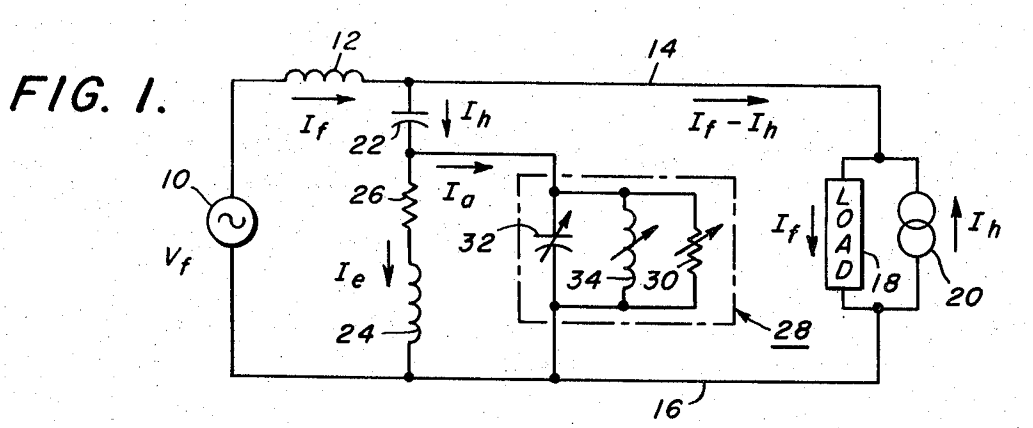
FIG. 1 is a schematic circuit diagram of one embodiment of the invention wherein harmonic currents are generated by a load section.
Figure 2:
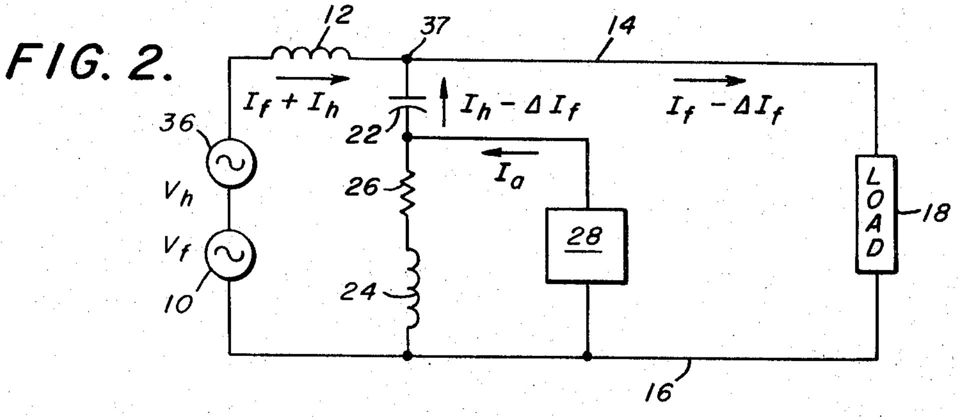
FIG. 2 is a schematic circuit diagram, similar to that of FIG. 1, for the case where harmonic currents are generated in the source section.
Figure 3:
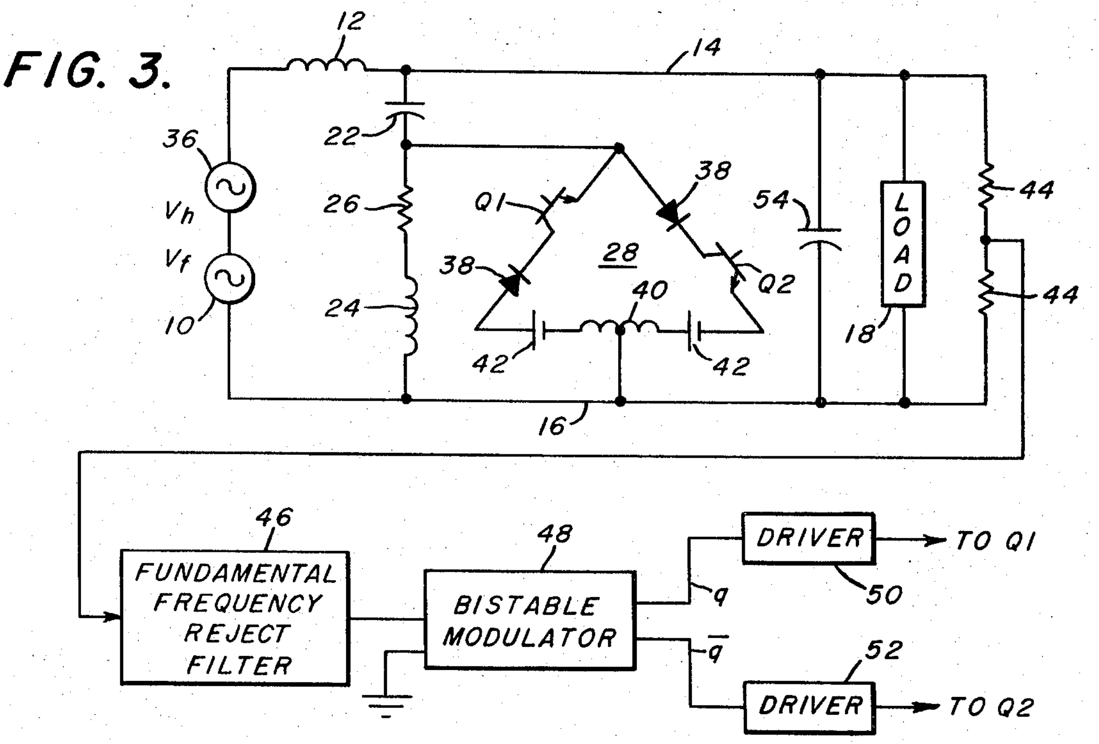
FIG. 3 is a circuit diagram illustrating one practical realization of the hybrid filter of the invention.

In the description which follows, and in particular with reference to FIGS. 1, 2 and 3, it will be assumed for purposes of explanation that only a single frequency ripple current of a particular frequency is generated in the source or load section; however it will be appreciated that this is not the actual case in most installations. In addition, the fundamental component of current flowing in the passive elements, as a result of the fundamental components appearing across these elements, is ignored.

In FIG. 1, there is shown an electrical power system including a source of alternating voltage, generally indicated by the reference numeral 10, which generates a fundamental voltage, $V_f$, of a particular frequency. The source 10 is connected through power conductors 14 and 16 to a linear load 18, the power conductor 14 including an inductor 12 which may comprise the internal inductance of the source 10. The hybrid filter itself comprises a capacitor 22 in series with an inductor 24 having a loss resistor 26 corresponding to the Q factor of the inductor 24. The resistor 26, in a practical embodiment, is not included as a separate element and represents the inherent resistance of the shunt path. Connected across inductor 24 and resistor 26 is the active element, generally indicated by the reference numeral 28 and enclosed by broken lines. The active element is shown in FIG. 1 in its equivalent component schematic form only. The function of the active element 28 is to make the impedance of the shunt branch zero (i.e., to make the effective Q of the passive filter infinite) at the actual harmonic frequency, independent of variations in the passive components and/or the alternating current source frequency.

To achieve a high or infinite Q factor, the active element 28 has to replenish the losses of the inductor (i.e., it has to supply a resistive component of current to the passive elements and thereby appears as a "negative" resistor) and keep the passive filter precisely tuned to the desired ripple frequency, in spite of component and frequency variations, by furnishing the required leading or lagging reactive current for the passive branch (i.e., it has to act as a variable capacitor or inductor). Thus, the active element 28 of the hybrid filter can be thought of as a variable negative resistor 30 in shunt with a variable capacitor 32, or inductor 34, as shown in FIG. 1.

To understand the operation of the hybrid filter of the invention, assume that the load 18, in addition to drawing a fundamental current $I_f$ from source 10, also generates a single frequency ripple current $I_h$ at a frequency $f_n$ (which in general is a multiple of the fundamental frequency). The ripple current is shown in the diagrammatic arrangement of FIG. 1 as being generated by a current generator 20. In actual practice, however, the load may be a thyristor converter or the like wherein the harmonics are generated by the switching nature of the load. Consider initially that capacitor 22 and inductor 24, forming a series resonant circuit, are tuned precisely to the ripple frequency $f_n$. The tuned passive branch would in this case provide a shunt resistance, equal to the resistance of resistor 26, at the ripple frequency across the terminals of the source 10. This results in a ripple voltage equal to the product of the harmonic current, $I_h$, times the resistance of resistor 26. Unless the sizes of the passive components 22 and 24 are unduly large, the value of resistor 26 is too high to provide enough attenuation. However, if the active element 28 is now controlled to provide an appropriate negative resistance such that the effective resistance of the total shunt branch is zero (i.e., the Q factor is infinity), then no ripple voltage will appear across the hybrid filter and the total ripple current $I_h$ will flow through the hybrid filter.

It will now be assumed that the effect of "infinite" Q factor of the hybrid filter is maintained, but that the component values of capacitor 22 and inductor 24 and/or the frequency of the source 10 vary. Under these circumstances, the impedance presented by the hybrid filter section would no longer be non-reactive and zero. Consequently, a ripple voltage would again appear across the terminals of the hybrid filter, and complete filtering of $I_h$ would not be achieved. The impedance of the hybrid filter can, however, be made zero if the active element is now controlled to provide, in addition to the negative resistance 30, an effective reactive impedance required for resonance. This means, of course, that the active element 28 must provide a real and reactive (either capacitive or inductive) component of current at the ripple frequency. The total current supplied by the active element is, however, only a fraction of the total ripple current carried by the hybrid filter. That is, the major portion of $I_h$ flows through the inductor 24 and is indicated as $I_e$; while only a small portion $I_a$ flows through the active element 28.

Consider, for example, that the frequency from source 10 is 5% higher than the nominal value to which the filter consisting of elements 22 and 24 is tuned. In this case, the effective value of inductor 24 must be reduced by 10%. This requires that the active element appear inductive and carry approximately 10%, while the inductor 24 carries 90% of the total ripple current. With this 10% reactive current, $I_a$, there is added in quadrature a real component of current representing the negative resistance 30. The increase in magnitude of the current in the active element due to the real component, however, is practically negligible, on the order of about 3%.

The function of the active element 28, of course, is to keep the complete hybrid filter connected between power conductors 14 and 16 tuned exactly to the frequency of the ripple component at an effective infinite Q under all conditions of input frequency and passive component variations, while being required to handle only a fraction (i.e., $I_a$) of the total ripple current, $I_h$. When high current applications are considered, the power rating of the necessary semiconductor devices in the active elements 28 can, therefore, be minimized.

In FIG. 2, elements corresponding to those of FIG. 1 are identified by like reference numerals. In this case, however, the ripple current $I_h$ is generated by a ripple generator 36 in series with the source 10. Hence, current flowing through inductor 12 is now $I_f$, the fundamental current, plus $I_h$ comprising the ripple current. As a result, a current $I_h - \Delta I_f$ must now flow into the point 37 such that, in accordance with Kirchhoff's law, the current flowing away from point 37 to the load 18 is only $I_f - \Delta I_f$ without any harmonic content. The fundamental component of current $\Delta I_f$ having the fundamental frequency will be present but does not affect the filtering. The active element 28 is again shown connected in shunt with the inductor 24; however it should be understood that in certain circumstances the active element can be connected in shunt with the capacitor 22.

A practical realization of the hybrid filter of the invention is shown in FIG. 3 wherein element corresponding to those of FIGS. 1 and 2 are again identified by like reference numerals. The active element 28 can be realized by either an inductor in a full-bridge configuration, or a coupled inductor 40 in a half-bridge configuration such as that shown in FIG. 3. The half-bridge configuration includes two transistors Q1 and Q2 in the two legs of the half-bridge configuration in series with diodes 38. One terminal of the half-bridge configuration is connected to the junction of capacitor 22 and inductor 24 in the passive filter; while the opposite ends of the two legs are connected through batteries 42 to the coupled inductor 40. The mid-point of the coupled inductor is connected to power conductor 16 as shown.

Depending upon whether the output voltage is to be instantaneously caused to decrease or increase to compensate for ripple voltage, either transistor Q1 or Q2 will be ON. The ripple voltage is sensed by means of a voltage divider comprised of resistors 44, along with the fundamental voltage. By passing the voltage thus sensed across the load through a fundamental frequency reject filter 46, only the harmonic content appears at the output of the filter 46 and is used to trigger a bistable modulator 48 which, in essence, is similar to a Schmitt trigger circuit. The output of the modulator 48 is either 1 or 0 depending upon whether the harmonic voltage appearing at the output of filter 46 is sufficiently greater than zero or less than zero to trigger the bistable modulator 48. The complementary outputs of the modulator 48 are then used as inputs to drive circuits 50 and 52 which amplify complementary output signals $q$ and $\bar{q}$ to provide sufficient drive for transistors Q1 and Q2. As a result, either Q1 or Q2 is ON depending upon the output of the modulator 48.

If the ripple voltage is sufficiently greater than zero to trigger the bistable modulator 48, then transistor Q1, for example, will be ON. On the other hand, if the ripple voltage is sufficiently less than zero to trigger the bistable modulator 48, then the transistor Q2 will be ON. Consequently, transistors Q1 and Q2 conduct alternately and a pulse width modulated current is produced by the active element 28, the mean value of this modulated current varying inversely with the ripple current generated by the load 18.

A more detailed description of the manner in which the active element operates is given in the aforesaid copending application identified supra. By reference to that application, it can be seen that instead of using a battery 42 in the active element 28, it is also possible to use an inductor as a current source, together with means for supplying power to the current source from the source 10 to compensate for losses in the active element itself. In the arrangement of FIG. 3, the high frequency switching harmonics generated by turn-on and turn-off of transistors Q1 and Q2 are filtered by means of a capacitor 54 connected acorss the load 18.

Figure 4:
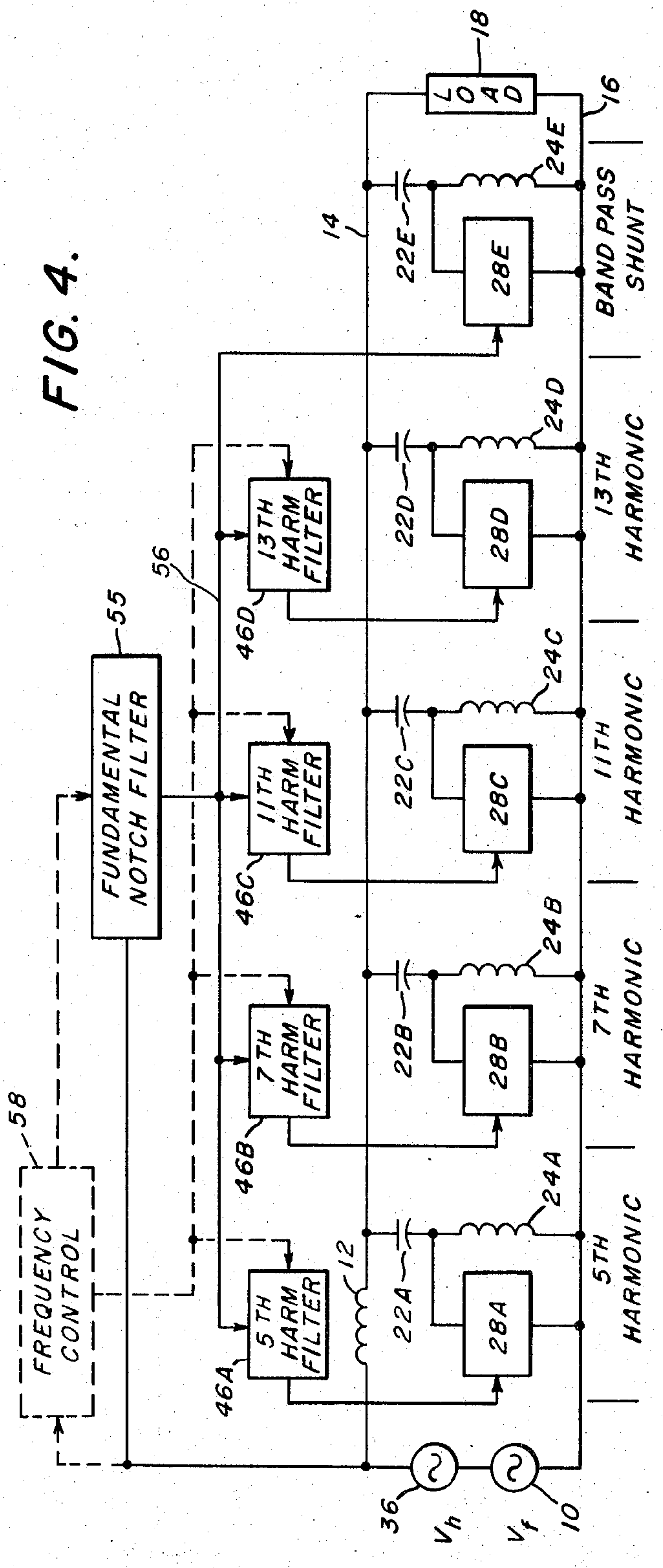
FIG. 4 is a schematic circuit diagram utilizing a plurality of the hybrid filters of the invention for the purpose of eliminating any one of a plurality of harmonic currents of differing frequencies.

As was mentioned above, in all of the examples given in FIGS. 1, 2 and 3, it is assumed that a ripple voltage of only one frequency is generated by the source or the load. In actual practice, however, this is not the case since ripple voltages (generally harmonics which are multiples of the source frequency) will be generated by either the source or the load. Consequently, the active element may be controlled to generate residual ripple current of all frequencies. In this case a single hybrid filter can be operated over a wide spectrum of frequencies and to remove ripple of all frequencies present. However, in high power applications, it is desirable to include a plurality of hybrid filters such as filters A-E between the power conductors 14 and 16 as shown in FIG. 4. Each of the filters includes a capacitor 22A, 22B, etc. connected in series with an inductor 24A, 24B, etc. In shunt with each of the inductors 24A, 24B, etc. is a current generator 28A, 28B and so on. Assuming a six-pulse rectifier load which generates harmonics of the 5th, 6th, 7th, etc. orders, the filter A, for example, may be tuned to the fifth harmonic, the filter B tuned to the seventh harmonic, filter C tuned to the eleventh harmonic, and filter D tuned to the thirteenth harmonic. The last hybrid filter E is designed to pass any harmonics which are not shunted by the preceding hybrid filters.

In order to drive the switching transistors in each of the active elements shown in FIG. 4, it is necessary to first apply the voltage applied across the input terminals of conductors 14 and 16 to a fundamental reject filter 55 which eliminates the fundamental frequency, thereby leaving on lead 56 only the harmonic frequencies. The fifth harmonic, for example, will then pass through filter 46A to control the current generator 28A in filter A. Similarly, the remaining harmonics will pass through filters 46B, 46C and 46D to control the active generators 28B-28D. The entire harmonic content on lead 56 is used to control the broadband shunt filter E.

If the input frequency should change, a shift in input frequency can be sensed by a frequency control circuit 58 which, in turn, will alter the rejection band of filter 55 as well as the pass-bands of filters 46A–46D.

Figure 5:
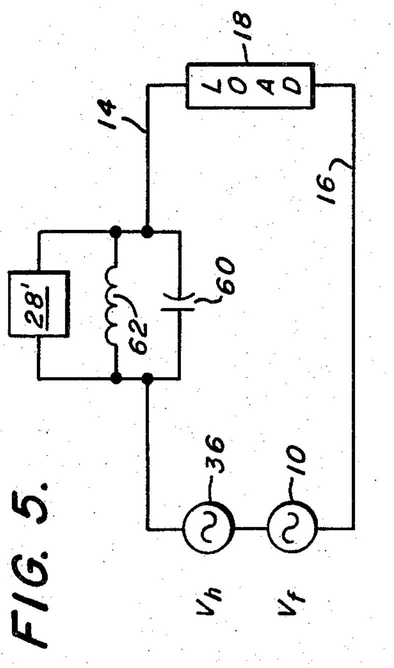
FIG. 5 is a schematic circuit diagram of another embodiment of the invention wherein a single hybrid filter is connected in series between the source and load section rather than across the power conductors connecting the source and load sections.

In all of the embodiments thus far described, the hybrid filter is connected in shunt across the source and load sections. However, in accordance with the invention, it is also possible to utilize a hybrid filter such as that shown in FIG. 5 which is connected in series between the source and load. In this embodiment, the hybrid filter forms an infinite impedance preventing the flow of ripple current as a result of ripple voltage appearing either in the source or load. The passive components of the filter now comprise a capacitor 60 in parallel with inductor 62, the parallel combination being included in power lead 14. In shunt with the inductor 62 is an active element 28', such as the active element 28 shown in FIG. 3, which senses any residual ripple appearing across the load or source section and generates a fictitious ripple which opposes the actual ripple. Of course, if the elements 60 and 62 are exactly tuned to the ripple frequency, and assuming that only one ripple frequency exitsts, then if the internal resistance of the passive elements is zero, the active element 28' will not come into play as is the case with the circuits previously described.

Figure 6:
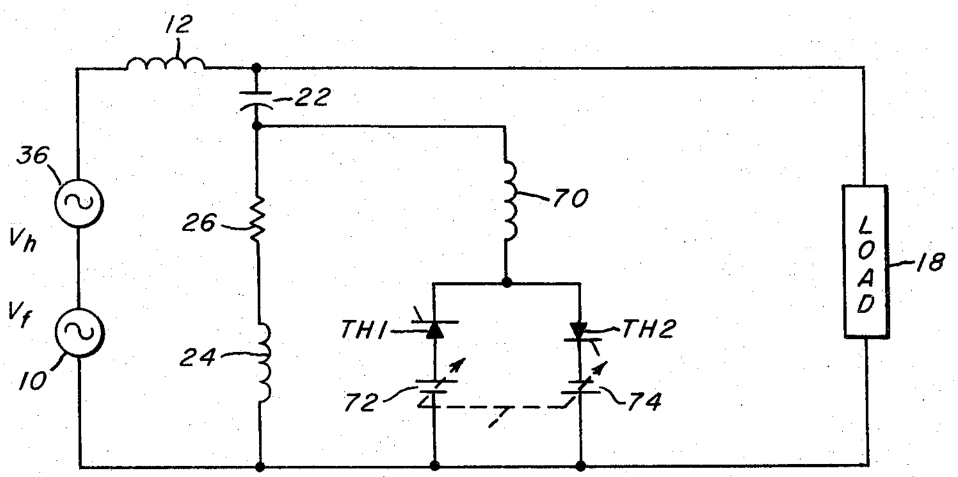
FIG. 6 is a schematic circuit diagram of still another embodiment of the invention employing naturally commutated thyristors.

Another form of active element employing naturally commutated thyristors is also possible provided that certain constraints are adhered to. Such a hybrid filter designed to filter a single harmonic frequency is illustrated in FIG. 6 wherein elements corresponding to those of FIG. 1 are identified by like reference numerals. In this embodiment, the main passive filter components comprising elements 22–26 are tuned slightly above the harmonic frequency of the source 36. An inductor 70 which has an inductance slightly lower than that which would be required, if connected in parallel with inductor 24 to bring the resultant series tuned filter to resonance, is connected in series with a pair of reverse back-to-back parallel thyristors TH1 and TH2 each having connected in series therewith an adjustable direct current voltage source 72 and 74, respectively. With this arrangement, and by controlling the phase angle of thyristor conduction at the harmonic frequency, the effective inductance of inductor 70 connected in parallel with inductor 24 can be adjusted to bring the hybrid filter exactly to resonance at the harmonic frequency. Furthermore, by adjusting the magnitude of the two equal and opposite direct current voltage sources 72 and 74, the losses of the passive components can be compensated for. Thus, as before, there is provided a precisely tuned filter of infinite "Q".

Figure 7:
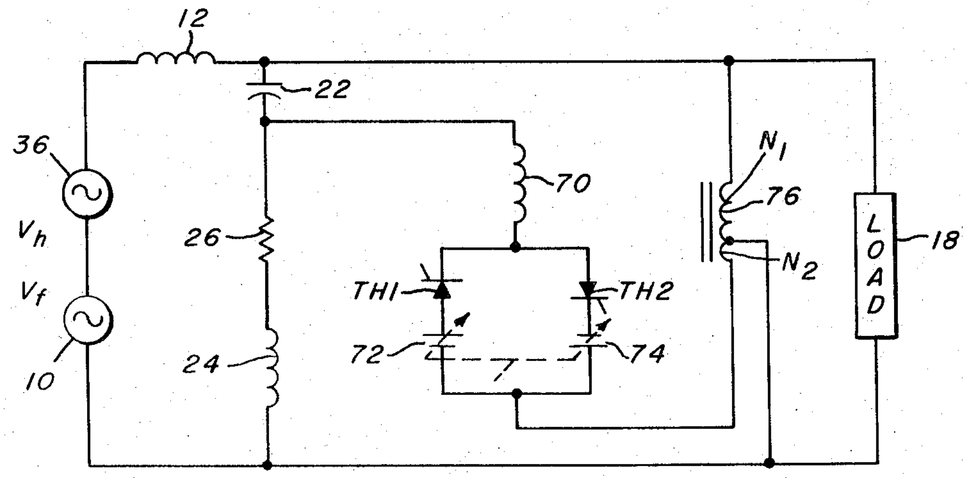
FIG. 7 is a schematic circuit diagram of a further embodiment of the invention employing naturally commutated thyristors in combination with an autotransformer.

A further improvement in the embodiment of FIG. 6 is shown in FIG. 7. In this case, an autotransformer 76 acts to prevent the voltage of fundamental frequency appearing across inductor 24 from appearing across the active element comprising the thyristor combination. The tap ratio of the transformer 76 depends on the order of the harmonic to be filtered. The required turns ratio is:

$$N_1/N_2 = [(\text{harmonic order})^2 - 1]/1$$

Thus, for the third harmonic $N_1/N_2 = 9 - 1$ or 8. Because of the high power ratings of available thyristors, and because of the ruggedness of this type of hybrid filter, it is very suitable for high power applications.

It can thus be seen that in the case of a single ripple frequency the invention provides a hybrid filter which, by keeping the filter precisely tuned to the ripple frequency by virtue of the active element, enables passive components of minimum size and rating to be used which, for high power systems, would be a major factor contributing to the cost and volume of the filter. Furthermore, the rating of the active filter, such as filter 28 in FIG. 3, can be drastically reduced over the case where a purely active filter is employed without passive components. In some applications, therefore, it becomes practical to use active filter elements employing devices such as electronic valves or transistors operated in a linear mode, without excessive losses.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. In an electrical system for supplying power from an electrical source section to a load section, one of said sections generating a single harmonic frequency fh to which the other section is subject to in the absence of filtering, the combination:

a hybrid filter interposed between said sections, and including at least two passive filter elements initially tuned to slightly above the said single harmonic frequency *fh;* a shunt inductor having preselected inductance;

a pair of reverse parallel thyristors, the pair being connected in series with said shunt inductor, the series combination of shunt inductor and the thyristor pair being connected in parallel with one of said passive filter elements, whereby by adjusting the phase angle of thyristor conduction, the effective inductance of said shunt inductor is adjusted to bring said hybrid filter exactly at resonance at *fh.*

2. The combination of claim 1 including:

a pair of adjustable d.c. voltage sources, each thyristor being connected in series with one of said d.c. sources, said d.c. sources being equal in magnitude and oppositely connected, whereby the losses of the passive components may be compensated for by adjusting the magnitudes of the two equal and opposite d.c. sources.

3. In an electrical system for supplying power from an electrical source section to a load section, one of said sections generating a harmonic frequency of order *h* to which the other section is subject to in the absence of filtering, the combination:

a hybrid filter interposed between said sections, and including at least two passive filter elements;

a shunt indicator having preselected inductance;

a pair of reverse parallel thyristors the pair being connected in series with said shunt inductor;

an autotransformer having a tap turns ratio of $N_1$ turns to $N_2$ turns, the series combination of shunt inductor, thyristor pair and $N_2$ turns being connected in parallel with one of said passive filter elements, said $N_1$ turns being connected across said load section, the untapped end of said $N_1$ being connected to said electrical source section, the required turns ratio being $$N_1/N_2 = [(h)^2 - 1]/1 \ .$$

4. The combination of claim 3 including:

a pair of adjustable d.c. voltage sources, each thyristor being connected in series with one of said d.c. sources, said d.c. sources being equal in magnitude and oppositely connected, whereby the losses of the passive components may be compensated for by adjusting the magnitude of the two equal and opposite d.c. sources.

* * * * *